United States Patent
Bacino et al.

(10) Patent No.: US 11,154,105 B2
(45) Date of Patent: Oct. 26, 2021

(54) CONFORMABLE SEAMLESS THREE DIMENSIONAL ARTICLES AND METHODS THEREFOR

(71) Applicant: W. L. Gore & Associates, Inc., Newark, DE (US)

(72) Inventors: John E. Bacino, Landenberg, PA (US); Norman E. Clough, Landenberg, PA (US); Orlando Collazo, Elkton, MD (US); Jean Norvell, New Castle, DE (US); Franz Shelley, Oxford, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 135 days.

(21) Appl. No.: 16/420,911

(22) Filed: May 23, 2019

(65) Prior Publication Data
US 2019/0274383 A1    Sep. 12, 2019

Related U.S. Application Data

(62) Division of application No. 15/241,813, filed on Aug. 19, 2016, now Pat. No. 10,314,353.
(Continued)

(51) Int. Cl.
*A41D 31/102* (2019.01)
*B32B 37/04* (2006.01)
(Continued)

(52) U.S. Cl.
CPC .............. *A41D 31/102* (2019.02); *A41D 1/02* (2013.01); *A41D 1/06* (2013.01); *A41D 1/14* (2013.01);
(Continued)

(58) Field of Classification Search
USPC .......................................... 2/239; 36/43, 84
See application file for complete search history.

(56) References Cited

U.S. PATENT DOCUMENTS

| | | |
|---|---|---|
| 517,210 A | 3/1894 | Cobb |
| 1,785,153 A | 12/1930 | Swanson |

(Continued)

FOREIGN PATENT DOCUMENTS

| | | |
|---|---|---|
| CN | 2598382 Y | 1/2004 |
| CN | 2845512 | 12/2006 |

(Continued)

OTHER PUBLICATIONS

International Search Report and Written Opinion.

*Primary Examiner* — Lynda Salvatore
(74) *Attorney, Agent, or Firm* — Greenberg Traurig, LLP

(57) ABSTRACT

Waterproof, breathable garments and methods of making are provided. The garments may include a laminate of a seamless ePTFE membrane and at least one textile. The garment is conformable over a range of sizes, and may be shaped to fit numerous sizes and shapes of forming molds. The ePTFE membrane may shrink to fit, or, alternatively, be stretched to fit, a mold having a desired size to form a garment. Such a conformable ePTFE membrane may allow for forming multiple sizes of garments with various sizes and shapes of molds. In embodiments where the ePTFE membrane is seamless and continuous, the garment eliminates the need for a waterproof seam tape, which is conventionally used to make garments waterproof.

26 Claims, 5 Drawing Sheets

Related U.S. Application Data

(60) Provisional application No. 62/207,191, filed on Aug. 19, 2015.

(51) Int. Cl.

| | | |
|---|---|---|
| *B29C 43/18* | (2006.01) | |
| *B29C 43/20* | (2006.01) | |
| *B29C 55/00* | (2006.01) | |
| *B29C 65/02* | (2006.01) | |
| *B29C 43/00* | (2006.01) | |
| *A41D 19/00* | (2006.01) | |
| *A41D 31/18* | (2019.01) | |
| *A41D 1/02* | (2006.01) | |
| *A41D 1/06* | (2006.01) | |
| *A41D 1/14* | (2006.01) | |

(52) U.S. Cl.
CPC ..... *A41D 19/0058* (2013.01); *A41D 19/0082* (2013.01); *A41D 31/18* (2019.02); *B29C 43/00* (2013.01); *B29C 43/183* (2013.01); *B29C 43/203* (2013.01); *B29C 55/00* (2013.01); *B29C 65/02* (2013.01); *B32B 37/04* (2013.01); *A41D 2500/52* (2013.01); *B29C 2043/189* (2013.01)

(56) References Cited

U.S. PATENT DOCUMENTS

| | | |
|---|---|---|
| 2,714,217 A | 8/1955 | Dore |
| 2,834,987 A | 5/1958 | Teague |
| 2,883,316 A | 4/1959 | Leahy et al. |
| 3,130,566 A | 4/1964 | Chesebro |
| 3,137,875 A | 6/1964 | Bingham, Jr. |
| 3,228,819 A | 1/1966 | Bingham, Jr. |
| 3,373,512 A | 3/1968 | Jacobson |
| 3,546,727 A | 12/1970 | Stemmler |
| 3,694,940 A | 10/1972 | Stohr |
| 4,019,265 A | 4/1977 | Epstein |
| 4,054,706 A | 10/1977 | Shapiro |
| 4,069,600 A | 1/1978 | Wise |
| 4,099,342 A | 7/1978 | Singh |
| 4,215,491 A | 8/1980 | Giannetti |
| 4,433,026 A | 2/1984 | Molde |
| 4,478,898 A | 10/1984 | Kato |
| 4,550,446 A | 11/1985 | Herman |
| 4,599,810 A | 7/1986 | Sacre |
| 4,809,447 A | 3/1989 | Pacanowsky et al. |
| 4,845,862 A | 7/1989 | Phillips, Jr. et al. |
| 4,888,829 A | 12/1989 | Kleinerman et al. |
| 4,943,473 A | 7/1990 | Sahatjian et al. |
| 4,967,494 A | 11/1990 | Johnson |
| 4,985,296 A | 1/1991 | Mortimer, Jr. |
| 5,036,551 A | 8/1991 | Dailey et al. |
| 5,044,096 A | 9/1991 | Polegato |
| 5,096,473 A | 3/1992 | Sassa et al. |
| 5,126,182 A | 6/1992 | Lumb et al. |
| 5,191,726 A | 3/1993 | Vallee |
| 5,221,572 A | 6/1993 | Meunier |
| 5,222,313 A | 6/1993 | Dowdy et al. |
| 5,253,434 A | 10/1993 | Curley, Jr. et al. |
| 5,325,541 A | 7/1994 | Willard |
| 5,329,807 A | 7/1994 | Sugar et al. |
| 5,351,352 A | 10/1994 | Chillemi |
| RE34,890 E | 4/1995 | Sacre |
| 5,402,540 A | 4/1995 | Williams |
| 5,409,761 A | 4/1995 | Langley |
| 5,418,054 A | 5/1995 | Sun |
| 5,431,970 A | 7/1995 | Broun et al. |
| 5,480,455 A | 1/1996 | Nowell |
| 5,483,703 A | 1/1996 | Williams |
| 5,497,942 A | 3/1996 | Zingle et al. |
| 5,499,459 A | 3/1996 | Tomaro |
| 5,526,584 A | 6/1996 | Bleimhofer et al. |
| 5,592,690 A | 1/1997 | Wu |
| 5,620,763 A | 4/1997 | House et al. |
| 5,640,718 A | 6/1997 | Aldridge |
| 5,650,225 A | 7/1997 | Dutta et al. |
| 5,655,226 A * | 8/1997 | Williams ............ A41B 11/005 2/239 |
| 5,700,544 A | 12/1997 | Goodwin et al. |
| 5,708,044 A | 1/1998 | Branca |
| 5,728,169 A | 3/1998 | Norvell |
| 5,732,413 A | 3/1998 | Williams |
| 5,738,937 A | 4/1998 | Baychar |
| 5,802,740 A | 9/1998 | Merk, Sr. |
| 5,832,539 A | 11/1998 | Williams |
| 5,918,382 A | 7/1999 | Haderlein et al. |
| 5,948,707 A | 9/1999 | Crawley et al. |
| 5,964,047 A | 10/1999 | Covatch |
| 5,981,019 A | 11/1999 | Goodwin et al. |
| 6,030,428 A | 2/2000 | Ishino et al. |
| 6,108,820 A | 8/2000 | Bernhardt |
| 6,112,432 A | 9/2000 | Bray, Jr. et al. |
| 6,151,802 A | 11/2000 | Reynolds |
| 6,158,253 A | 12/2000 | Svoboda et al. |
| 6,226,898 B1 * | 5/2001 | Trimble ............ A43B 3/0047 36/10 |
| 6,275,997 B1 | 8/2001 | Richardson |
| 6,299,962 B1 | 10/2001 | Davis et al. |
| 6,305,101 B2 | 10/2001 | Chemello |
| 6,446,267 B1 | 9/2002 | Shah |
| 6,446,360 B1 | 9/2002 | Sheets et al. |
| 6,474,002 B2 | 11/2002 | Chen |
| 6,541,589 B1 | 4/2003 | Baillie |
| 6,550,289 B1 | 4/2003 | Higgins |
| 6,571,397 B1 | 6/2003 | Williams |
| 6,651,257 B2 | 11/2003 | Smith |
| 6,662,377 B2 | 12/2003 | Williams |
| 6,665,883 B2 | 12/2003 | Sloan |
| 6,716,778 B1 | 4/2004 | Hottner |
| 6,851,205 B2 | 2/2005 | Chen et al. |
| 6,880,173 B2 | 4/2005 | Green |
| 6,935,053 B2 | 8/2005 | Wiener |
| 6,981,341 B2 | 1/2006 | Baychar |
| 7,055,267 B2 | 6/2006 | Wilson et al. |
| 7,306,729 B2 | 12/2007 | Bacino et al. |
| 7,314,840 B2 | 1/2008 | Baychar |
| 7,370,438 B2 | 5/2008 | Vattes et al. |
| 7,451,497 B2 | 11/2008 | von Bluecher |
| 7,531,611 B2 | 5/2009 | Sabol et al. |
| 7,624,456 B2 | 12/2009 | Williams et al. |
| 7,730,555 B2 | 6/2010 | Hexels |
| 8,028,440 B2 | 10/2011 | Sokolowski et al. |
| 8,056,149 B2 | 11/2011 | Duclos |
| 8,176,659 B2 | 5/2012 | von Blucher |
| 8,256,030 B2 | 9/2012 | Williams et al. |
| 8,435,617 B2 | 5/2013 | Hannon |
| 8,569,190 B2 | 10/2013 | Baychar |
| 8,637,144 B2 | 1/2014 | Ford |
| 9,027,166 B1 | 5/2015 | Hagberg |
| 9,084,445 B2 | 7/2015 | Lin et al. |
| 9,192,210 B2 | 11/2015 | Mordecai |
| 9,339,068 B2 | 5/2016 | Baacke |
| 2001/0037587 A1 | 11/2001 | Lu |
| 2002/0012784 A1 | 1/2002 | Norton et al. |
| 2003/0029058 A1 | 2/2003 | Lin |
| 2003/0051375 A1 | 3/2003 | Chun-Ming |
| 2003/0131397 A1 | 7/2003 | Sloan |
| 2003/0131498 A1 | 7/2003 | Liang |
| 2003/0148076 A1 | 8/2003 | Huang |
| 2003/0154625 A1 | 8/2003 | Royle |
| 2003/0167656 A1 | 9/2003 | Tung |
| 2003/0177566 A1 | 9/2003 | Williams |
| 2004/0020077 A1 | 2/2004 | Thomas et al. |
| 2004/0049942 A1 | 3/2004 | Chen |
| 2004/0058102 A1 | 3/2004 | Baychar |
| 2004/0064972 A1 | 4/2004 | Chen et al. |
| 2004/0111787 A1 | 6/2004 | Green |
| 2004/0139628 A1 | 7/2004 | Wiener |
| 2004/0139629 A1 | 7/2004 | Wiener |
| 2004/0143996 A1 | 7/2004 | Chen et al. |
| 2004/0187352 A1 | 9/2004 | Chen et al. |

(56) References Cited

U.S. PATENT DOCUMENTS

| | | |
|---|---|---|
| 2004/0200094 A1 | 10/2004 | Baychar |
| 2004/0216332 A1 | 11/2004 | Wilson et al. |
| 2004/0226076 A1 | 11/2004 | Chen |
| 2005/0034330 A1 | 2/2005 | Baychar |
| 2005/0076541 A1 | 4/2005 | von Blucher |
| 2005/0193593 A1 | 9/2005 | Chu et al. |
| 2005/0210708 A1 | 9/2005 | Chen |
| 2005/0246821 A1 | 10/2005 | Kopp et al. |
| 2006/0117457 A1 | 6/2006 | Williams et al. |
| 2006/0137223 A1 | 6/2006 | Ziccarelli |
| 2006/0174517 A1 | 8/2006 | Chang |
| 2007/0062067 A1 | 3/2007 | Covatch |
| 2007/0124849 A1 | 6/2007 | Williams et al. |
| 2007/0227038 A1 | 10/2007 | Edington et al. |
| 2007/0294920 A1 | 12/2007 | Baychar |
| 2009/0172971 A1 | 7/2009 | Peikert et al. |
| 2009/0235433 A1 | 9/2009 | Harris et al. |
| 2009/0300833 A1 | 12/2009 | Kampert et al. |
| 2010/0011619 A1 | 1/2010 | Bastianelli et al. |
| 2010/0024254 A1 | 2/2010 | Combs |
| 2010/0248324 A1 | 9/2010 | Xu et al. |
| 2011/0056096 A1 | 3/2011 | Raith et al. |
| 2011/0061148 A1 | 3/2011 | Egozi |
| 2011/0107621 A1 | 5/2011 | Mordecai et al. |
| 2011/0162239 A1 | 7/2011 | Bier et al. |
| 2011/0167677 A1 | 7/2011 | Peikert et al. |
| 2011/0179549 A1 | 7/2011 | Zaggl et al. |
| 2011/0265348 A1 | 11/2011 | Schmutte |
| 2011/0268959 A1 | 11/2011 | Thottupurathu |
| 2011/0277217 A1 | 11/2011 | Yoo |
| 2012/0073164 A1 | 3/2012 | Linth et al. |
| 2012/0090077 A1* | 4/2012 | Brown .................. A41B 11/007 2/239 |
| 2012/0201988 A1 | 8/2012 | Hansen et al. |
| 2013/0086817 A1 | 4/2013 | Myerscough |
| 2013/0232818 A1 | 9/2013 | Wiener |
| 2013/0283548 A1 | 10/2013 | Wang |
| 2013/0291293 A1 | 11/2013 | Jessiman et al. |
| 2014/0090273 A1 | 4/2014 | Piontkowski |
| 2014/0137434 A1 | 5/2014 | Craig |
| 2014/0352178 A1 | 12/2014 | Bruce et al. |
| 2015/0027001 A1 | 1/2015 | VanDernoot et al. |
| 2015/0107307 A1 | 4/2015 | Kosui et al. |
| 2015/0150335 A1 | 6/2015 | Healy et al. |
| 2015/0230541 A1 | 8/2015 | Bacino et al. |
| 2015/0230542 A1 | 8/2015 | Bacino |
| 2015/0230543 A1 | 8/2015 | Bacino et al. |
| 2015/0230544 A1 | 8/2015 | Bacino et al. |
| 2015/0230545 A1 | 8/2015 | Bacino et al. |
| 2015/0230550 A1 | 8/2015 | Bacino et al. |
| 2015/0230553 A1 | 8/2015 | Bacino |
| 2015/0230554 A1 | 8/2015 | Bacino et al. |
| 2015/0230563 A1 | 8/2015 | Bacino et al. |
| 2016/0113356 A1 | 4/2016 | Clough et al. |
| 2017/0049170 A1 | 2/2017 | Bacino et al. |

FOREIGN PATENT DOCUMENTS

| | | |
|---|---|---|
| CN | 101313784 A | 12/2008 |
| EP | 0758416 | 2/1997 |
| EP | 0850576 A3 | 4/1999 |
| EP | 0725574 B1 | 1/2003 |
| EP | 0927524 B1 | 5/2003 |
| EP | 0954627 B1 | 11/2003 |
| EP | 1522228 A1 | 4/2005 |
| EP | 1307115 B1 | 11/2005 |
| EP | 1621092 A1 | 2/2006 |
| EP | 1635665 B1 | 9/2007 |
| EP | 1860966 B1 | 9/2009 |
| EP | 2 161 127 A1 | 10/2010 |
| EP | 2 238 850 A1 | 10/2010 |
| EP | 2238850 A1 | 10/2010 |
| EP | 2353421 A1 | 8/2011 |
| EP | 1720697 B1 | 8/2013 |
| FR | 864911 | 5/1941 |
| FR | 1326488 A | 5/1963 |
| GB | 270033 | 5/1927 |
| GB | 2408190 | 5/2005 |
| GB | 2516121 A | 1/2016 |
| JP | H03-11806 | 2/1991 |
| JP | 2000-83707 A | 3/2000 |
| JP | 2000-210104 A | 8/2000 |
| JP | 2007-518887 | 7/2007 |
| JP | 2013-505809 | 2/2013 |
| JP | 2013-536707 | 9/2013 |
| WO | WO-94/09965 A1 | 5/1994 |
| WO | WO-01/12889 A1 | 2/2001 |
| WO | WO-2008/015098 A1 | 2/2008 |
| WO | WO-2009/149887 A1 | 12/2009 |
| WO | WO-2010/022968 A1 | 3/2010 |
| WO | WO-2010/132083 A1 | 11/2010 |
| WO | WO-2013/087324 A1 | 6/2013 |
| WO | WO-2013/087824 A1 | 6/2013 |
| WO | WO-2015/128482 A1 | 8/2015 |

* cited by examiner

CONFORMABLE SEAMLESS THREE DIMENSIONAL ARTICLES AND METHODS THEREFOR

CROSS REFERENCE TO RELATED APPLICATIONS

This patent application is a divisional of U.S. patent application Ser. No. 15/241,813, entitled "Conformable Seamless Three Dimensional Articles and Methods Therefor," filed Aug. 19, 2016, which claims priority from U.S. Provisional App. No. 62/207,191, entitled "Conformable Seamless Three Dimensional Articles and Methods Therefor," filed Aug. 19, 2015, the disclosure of which are incorporated herein by reference in their entirety.

FIELD OF THE INVENTION

The present invention relates generally to seamless, three dimensional articles and methods of making, and more specifically, to waterproof, breathable garments and articles that are conformable over a range of sizes. Articles of the present invention may include articles for covering the upper and/or lower torso of a wearer, such as seamless gloves, hats, shirts, jackets, vests, pants, leggings, arm coverings, leg coverings and the like.

BACKGROUND OF THE INVENTION

Waterproof, breathable garments are typically formed of laminates incorporating a waterproof, water-vapor permeable functional material that is arranged as a layer in a textile laminate within a garment. As used herein, the term "garment" is intended to include articles for covering the upper and/or lower torso of a wearer, such as seamless gloves, hats, shirts, jackets, vests, pants, leggings, leg coverings, arm coverings, garment inserts from these materials, and the like. Materials which are both waterproof and water vapor permeable are commonly referred to as "functional" materials. The functional layer may be made of an expanded polytetrafluoroethylene (ePTFE) material available from W. L. Gore and Associates, Inc., Elkton, Md., under the tradename GORE-TEX®. The expanded PTFE is characterized as having a density less than 2.0 g/cm³. Other functional materials, such as polyurethanes, have also been developed and are known in the art.

U.S. Pat. No. 8,256,030 describes waterproof, breathable non-textile seamed articles which exhibit high levels of durability and allow wearers a high level of flexibility and article strength. Two non-textile materials, such as ePTFE, are joined around the desired periphery by a suitable sealing means to form a seam. US Pub. No. 2011/0179549 also shows a seamed glove.

It can be challenging to sew together the garment component panels, incorporating the laminate of textile(s) and functional layer(s), to form a waterproof and water vapor permeable garment, as the functional layer becomes permeable to water when it is pierced during the sewing process. It is therefore necessary that the laminate panels are assembled and joined by a waterproof joining process whereby the seams are sealed with a superimposed adhesive or sealing tape that is applied to the seam by a bonding or welding process.

Challenges that often results when forming such waterproof, breathable garments include limitations on garments design to allow for effective seam taping during manufacture, issues with the seam sealing depending on the types of laminates being joined, stiffness of seams, unattractive appearance, and the like. A further problem is that sealing the seamed portions of the garment to make the garment waterproof may compromise the breathability and flexibility of the garment and contribute to poor fit or comfort.

Thus, there remains a need in the art for waterproof and breathable garments that are easy to manufacture and comfortable to wear.

SUMMARY OF THE INVENTION

It is an object of the invention to provide a garment comprising a seamless conformed expanded polytetrafluoroethylene (ePTFE) membrane having a first side and a second side. In a further embodiment of the invention, seamless conformed ePTFE membrane has a three dimensional configuration of the garment or portion thereof.

It is an object of the invention to provide a garment comprising a seamless conformed film having a first side and a second side. In a further embodiment of the invention, the film may be selected from the group consisting of expanded polytetrafluoroethylene (ePTFE), polyurethane (PU), polyethylene (PE), polyester (PES), polypropylene (PP), polyether (PE), polyacrylonitrile (PAN), polystyrene, polyamide, polybenzimidazole (FBI), polycarbonate, polyethylene-co-vinyl acetate (PEVA), polyvinylchloride (PVC), cellulose acetate, polyimide, and block and random copolymers thereof. As used herein the film may be referred to as ePTFE, but it should be understood that any of the other films materials may also be used in other embodiments.

It is a further object of the invention to provide a garment comprising a seamless conformed ePTFE membrane or conformed film having a first side and a second side, and further comprising a first textile joined to the first side of the conformed ePTFE membrane or conformed film, and wherein the seamless conformed ePTFE membrane or conformed film and textile form a laminate.

In a further embodiment of the invention, a second textile may be joined to the conformed ePTFE membrane or conformed film on the second side opposing the first textile, and wherein the seamless conformed ePTFE membrane or conformed film, the first textile, and the second textile form a laminate. In one embodiment, the first textile forms an interior portion of the garment, and the second textile forms an exterior portion of the garment.

In another embodiment of the invention, the conformed ePTFE membrane or conformed film has at least one additional layer thereon. Additionally, at least one of the first textile and the second textile may have at least one additional layer thereon. The at least one additional layer may be selected from the group consisting of an abrasion resistant coating and an oleophobic coating. Other coating compositions are also contemplated as within the scope of the invention.

In an embodiment of the invention, the conformed ePTFE membrane or conformed film may have a thickness variation from a first location in the garment to a second location in the garment.

Textiles suitable for use in connection with the invention may have varying properties depending on the desired end use. For example, in some embodiments, it may be desirable that at least one of the first textile and the second textile have at least some elastic properties. The first textile and second textile may be selected from knitted textiles, nonwoven textiles and woven textiles.

In certain embodiments, the seamless, three dimensional garments made according to the invention are waterproof and breathable. In other embodiments, a portion of the garment may be seamless and have a three dimensional configuration of the portion and that portion may be waterproof and breathable.

In certain embodiments, the garments of the present invention may further comprise at least one second component joined to the conformed ePTFE membrane or conformed film which creates at least one region in the garment possessing a function or feature different from the conformed ePTFE membrane or conformed film. In certain embodiments, the at least one second component may be selected from the group consisting of a textile, a second component laminate, a textile laminate, a polymer membrane and a second ePTFE membrane or second film different from said conformed ePTFE membrane or conformed film.

In order to join the first textile and/or the second textile to the conformed ePTFE membrane or conformed film, it may be desirable to utilize a discontinuous adhesive or a continuous breathable adhesive.

Garments of the invention may take the form of gloves, hats, shirts, jackets, vests, arm coverings and other upper torso coverings, as well as inserts for such garments. Garments of the invention may also take the form of pants, leggings, leg coverings and other lower torso coverings, as well as inserts for such garments.

It is a further object of the present invention to provide methods for forming seamless waterproof, breathable garments.

In one embodiment, a method is provided for forming a garment comprising providing a conformable expanded polytetrafluoroethylene (ePTFE) tape or other film material having an extensibility of at least 1.5× in at least one direction; providing a garment mold having the shape of a garment to be formed; and stretching the conformable ePTFE tape over the garment mold to form a seamless garment comprising a conformed ePTFE membrane.

In another embodiment, a method is provided for forming a garment comprising applying an adhesive on one of (1) a side of a textile or (2) a side of a conformable expanded polytetrafluoroethylene (ePTFE) tape or other film material having an extensibility of at least 1.5× in at least one direction; positioning said textile on a garment mold; and stretching the conformable ePTFE tape or other film material over the textile and garment mold to form a seamless garment comprising a conformed ePTFE membrane or conformed film, adhesive, and the textile, and having substantially the shape of the garment mold.

In a further embodiment, the garment may optionally be heated such as in an oven, via a heated garment mold, or some combination, to a temperature from about 50° C. to about 200° C. The ePTFE membrane or conformed film in the garment may have a thickness variation from a first location in said garment to a second location in said garment.

In certain embodiments, it may be desirable to heat the garment to a temperature from about 340° C. to about 375° C. to amorphously lock the ePTFE membrane or conformed film.

In one embodiment, it may be desirable to include a stretching step comprising positioning the ePTFE tape or other film material over the garment mold; and rotating the garment mold through the ePTFE tape or other film material to form the garment.

Another embodiment of the invention includes a method of forming a seamless garment comprising applying a first adhesive on at least one of (1) a side of a first textile and (2) a side of a conformable expanded polytetrafluoroethylene (ePTFE) tape or other film material having an extensibility of at least 1.5× in at least one direction; positioning said textile on a garment mold; stretching the conformable ePTFE tape or other film material over the first textile and the garment mold to form a first composite comprising a conformed ePTFE membrane or conformed film, said first adhesive, and said first textile; positioning a second composite comprising a second adhesive and a second textile on the first composite such that the second adhesive is positioned on the conformed ePTFE membrane or conformed film to form a seamless garment; and heating the seamless garment and garment mold to a temperature from about 50° C. to about 200° C.

It is an advantage of the present invention that the ePTFE membrane or conformed film in the garment may be seamless. In one embodiment, to be seamless refers to the ePTFE membrane continuously surrounding or encircling the garment mold in at least one plane without a seam.

It is another advantage of the present invention that garments made from a seamless, shaped ePTFE membrane or conformed film may have enhanced breathability over conventional garments made by sewing together pieces of laminate material and sealing by a bonding or welding process.

It is a further advantage of the present invention that the garment is conformable over a range of garment mold sizes and shapes.

It is a feature of the present invention that the garment may be heated conforms in a thermal heating step to amorphously lock the ePTFE membrane or conformed film.

It is another feature of the present invention that the seamless garments may be breathable over their entireties.

DEFINITIONS

The term "conformable ePTFE tape" or "conformable film tape" as used herein is meant to describe an ePTFE structure or other material structure that is extendable or extensible in a first direction, which recovers in a second direction perpendicular to the first direction, and which is elongated to conform to the shape of a three dimensional object, e.g., garment mold, without fracturing, tearing, or otherwise breaking.

The term "extensibility" as used herein is meant to define the capability of the ePTFE tape or film tape to elongate or stretch. In certain embodiments, the extensible ePTFE tape and/or film has a minimum elongation at break of 200% or more in at least one direction, e.g., 300% or more, or 500% or more, according to ASTM D 638 (2003). In one embodiment, the extensible ePTFE tape and/or film has a minimum elongation at break of 200% to 500% in at least one direction.

The term "ePTFE membrane" as used herein with respect the formation of the garments described herein, is meant to describe a conformable ePTFE tape that has been stretched or expanded over a three dimensional object and which substantially maintains the three dimensional shape of the object. It is to be understood that the "ePTFE membranes" described herein are porous and have a microstructure of nodes interconnected by fibrils.

The term "film" as used herein refers to a layer or membrane that comprises a material that is selected from the group consisting of expanded polytetrafluoroethylene (ePTFE), polyurethane (PU), polyethylene (PE), polyester (PES), polypropylene (PP), polyether (PE), polyacrylonitrile (PAN), polystyrene, polyamide, polybenzimidazole (PBI), polycarbonate, polyethylene-co-vinyl acetate (PEVA), polyvinylchloride (PVC), cellulose acetate, polyimide, and block and random copolymers thereof. In certain embodiments, the film is an extensible film. It is to be understood that the films described herein may be porous and may be selected from the group consisting of expanded polytetrafluoroethylene (ePTFE), polyurethane (PU), polyethylene (PE), polyester (PES), polypropylene (PP), polyether (PE), polyacrylonitrile (PAN), polystyrene and copolymers thereof. In addition, the films may be waterproof and/or breathable. The film may be a conformable film, meaning that the conformable film has the three-dimensional configuration of the garment mold or portion thereof when being formed.

The term "garment" is intended to refer to articles for covering the upper and/or lower torso of a wearer, such as seamless gloves, hats, shirts, upper torso covering, lower torso covering, jackets, vests, pants, leggings, leg coverings, arm coverings, garment inserts having these configurations, and the like.

The term "conformed" as used herein is meant to describe garments comprising ePTFE membrane or other film materials having substantially the three dimensional shape of a garment mold or a portion thereof.

As used herein, the term "textile" is meant to denote any woven, nonwoven, felt, knit, stretch spunbond nonwoven, stretch needlepunched non-woven, stretch spunlace non-woven, or fleece and can be composed of natural and/or synthetic fiber materials and/or other fibers or flocking materials that has at least some elastic properties.

The term "elastic" as used herein is meant to denote that the material has stretch characteristics and can be tensioned; and, upon the release of tension, the material returns to its approximate original dimensions.

The term "highly elastic" or "high elasticity" as used herein is meant to describe materials that have stretch characteristics and can be tensioned at least about 50% (or greater); and, upon the release of tension, the material returns to its approximate original dimensions.

The term "seam" or "seamed" as used herein is meant to include the joining of two portions, regions, or materials. A seam may join similar or identical materials or two or more dissimilar materials (e.g. dissimilar textile pieces or a laminate to a shoe insert). The terms "seam" and "seamed" are not intended to be limited to stitching and/or sewing. "Seam" and "seamed" as used herein are meant to include any suitable means of joining two portions regions, or materials, such as by adhesives, bonding, welding, laminating, and the like.

The term "waterproof" as used herein is meant to define a garment that prevents the passage of liquid water as would be understood by an artisan of skill in the art.

The term "thickness variation" as used herein is meant to describe a ratio of the difference in thickness of the ePTFE membrane or other film material at a first position compared to a second position.

The term "on" as used herein is meant to denote that when an element is "on" another element, it can be directly on the other element or intervening elements may also be present.

The terms "adjacent" and "adjacent to" as used herein are meant to denote that when an element is "adjacent" to another element, the element may be directly adjacent to the other element or intervening elements may be present.

The term "over" as used herein is meant to denote that when an element is "over" another element, it can be directly over the other element or intervening elements may also be present.

The terms "additional component" or "second component" as used herein are meant to describe any material, such as a textile, a laminate (e.g. including a polymer membrane), a textile laminate, a polymer membrane (e.g., polytetrafluoroethylene or expanded polytetrafluoroethylene), a second conformed film different from the first conformed film (e.g., having a characteristic or property different from the first film), that is attached by at least one seam to a garment described herein.

The phrase "hybrid garment" as used herein is meant to describe a garment that has included therein one or more region(s) that has a different function(s) or different material(s) from the seamless conformed ePTFE membrane or other film material.

BRIEF DESCRIPTIONS OF FIGURES

The advantages of this invention will be apparent upon consideration of the following detailed disclosure of the invention, especially when taken in conjunction with the accompanying drawings wherein.

DETAILED DESCRIPTION OF THE INVENTION

Figure 1:
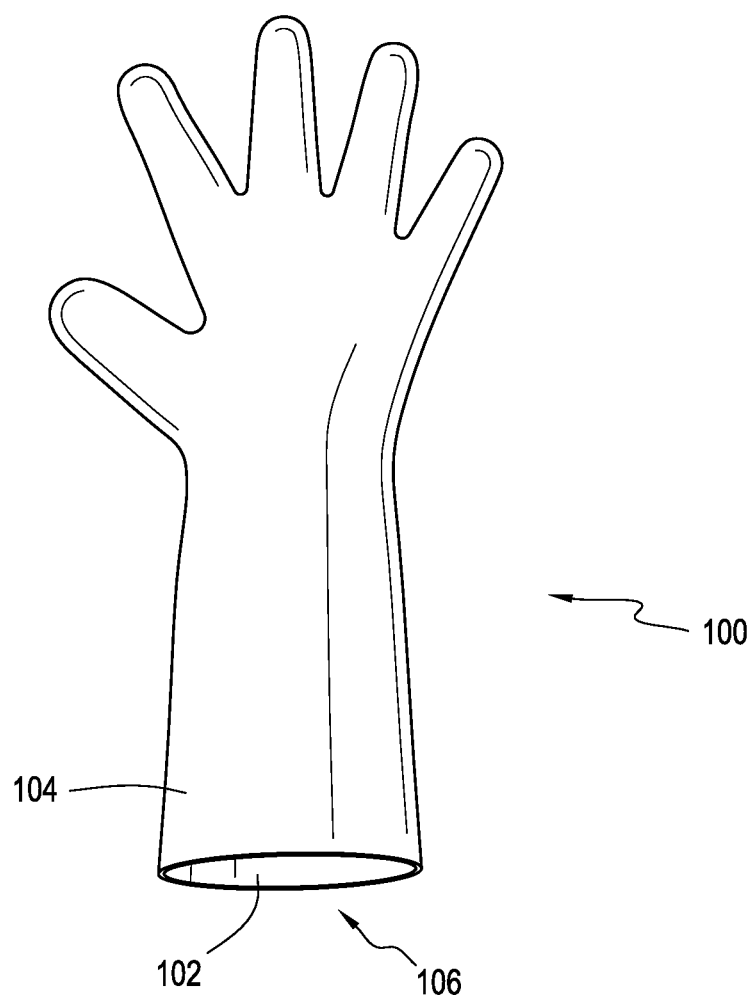
FIG. 1 is a schematic illustration depicting a three dimensional seamless glove according to at least one embodiment of the present invention.

The present invention relates generally to seamless, three dimensional articles and methods of making, and more specifically, to waterproof, breathable garments and articles that are conformable over a range of sizes. Articles of the present invention may include articles for covering the upper and/or lower torso of a wearer, such as seamless gloves, hats, shirts, jackets, vests, pants, leggings, arm coverings, leg coverings and the like.

The garment is conformable over a range of sizes and shapes of garment molds. The garment may shrink to fit, or, alternatively, be stretched to fit, a garment mold having a desired size to form a garment. The seamless garment reduces or eliminates the need for a waterproof seam tape used in conventional garments to make them waterproof. It is to be appreciated that the garments of the present invention are meant to include men's, women's, and children's garments.

The conformable ePTFE tape or conformable film tape used in forming the garments described herein is capable of elongating or stretching in a first direction and recovering in a second direction that is perpendicular to the first direction. The conformable ePTFE tape or conformable film tape has an extensibility in the first direction from about 1.5× to about 140×. In some embodiments, the conformable ePTFE tape or conformable film tape has an extensibility in the first direction greater than about 3×, greater than about 10×, greater than about 30×, greater than about 40×, greater than about 50×, greater than about 60×, greater than about 70×, greater than about 80×, greater than about 90×, greater than about 100×, greater than about 110×, greater than about 120×, greater than about 130×, greater than about 140×, or even greater. The extensibility of the conformable ePTFE tape or conformable film tape may range from about 3× to about 130×, from about 10× to about 120×, or from about 50× to about 100×. The conformable ePTFE tape or conformable film tape may or may not be heated prior to elongation or stretching. Additionally, the conformable ePTFE tape or conformable film tape may be elongated or stretched over a three dimensional object to conform to the shape of a three dimensional object without fracturing, tearing, or otherwise breaking.

One suitable example of a conformable ePTFE tape for use herein is a conformable expanded polytetrafluoroethylene (ePTFE) tape, such as an ePTFE tape made in accordance with the teachings of U.S. Pat. No. 7,306,729 to Bacino, et al, and described in detail in the Examples set forth below. It is envisioned that other suitable conformable microporous ePTFE tapes having an extensibility of at least 1.5× in at least one direction may be utilized in forming the booties, shoe inserts, and waterproof socks, and would be easily identifiable by those of skill in the art. The pores of the conformable ePTFE tape may be sufficiently tight so as to provide waterproofness, yet sufficiently open to provide properties such as moisture vapor transmission and the penetration by coatings of colorants and oleophobic or other compositions. The conformable ePTFE tape may be deformed at room temperature, or upon the application of heat, into an ePTFE membrane having a three-dimensional shape. It is to be understood that the ePTFE membranes described herein are porous and are characterized by a microstructure of nodes interconnected by fibrils.

Expanded polytetrafluoroethylene (ePTFE) is described herein as an exemplary embodiment, but it is to be appreciated that expanded PTFE, expanded modified PTFE, and expanded copolymers of PTFE are all considered to be within the purview of the invention, and are all considered to be within the meaning of ePTFE as used herein. Patents have been filed on expandable blends of PTFE, expandable modified PTFE, and expanded copolymers of PTFE, such as U.S. Pat. No. 5,708,044 to Branca; U.S. Pat. No. 6,541,589 to Baillie; U.S. Pat. No. 7,531,611 to Sabol et al.; U.S. Pat. No. 8,637,144 to Ford; and U.S. Pat. No. 9,139,669 to Xu et al.

In other embodiments, the film material may comprise a material that is different from ePTFE. In certain embodiments, the film may comprise polyurethane (PU), polyethylene (PE), polyester (PES), polypropylene (PP), polyether (PE), polyacrylonitrile (PAN), polystyrene, polyamide, polybenzimidazole (PBI), polycarbonate, polyethylene-co-vinyl acetate (PEVA), polyvinylchloride (PVC), cellulose acetate, polyimide, and block and random copolymers thereof. The film material may be extensible that refers to the property of the film material prior to being made into garments having a three-dimensional configuration of a last or portion thereof and once made into the three-dimensional garment the film may not be extensible, but the film may be referred to as an extensible film in the garment.

In addition, the incorporation of filler materials in various forms within the conformable ePTFE tape or film tape is also considered to be within the purview of the invention. Non-limiting examples of suitable filler materials include carbon black, aerogels, metals, semi-metals, ceramics, carbon/metal particulate blends, activated carbon, and the like.

The garment molds may be formed of virtually any material, such as, for example, a polymer (e.g., nylon) or a metal (e.g., aluminum materials). Coatings, such as silicon coatings, or other suitable coating, may be applied to act as a release liner. It is to be appreciated that the garment molds may be formed to have different shapes and/or sizes depending on the end article to be formed. It is also possible to use garment molds which are multi-piece and capable of being modified to change shape and/or size. The garment molds can therefore be customized to meet a variety of shapes and sizes to meet desired end uses.

The garments of the present invention may comprise ePTFE membranes or film materials, whether single or multi-layer in configuration. For purposes of clarity the conformable layer is referred to as a conformable ePTFE membrane, but it should be understood that in other embodiments another conformable film materials may be used. In one embodiment, the seamless garments of the present invention may comprise a waterproof, breathable laminate having a seamless, conformed ePTFE membrane layer, an adhesive layer, and a textile layer. The terms "textile(s)" and "textile layer(s)" may be used interchangeably herein. In forming the laminate of a 2-layer article, an adhesive may be applied to one side of a textile, and the textile/adhesive composite may be positioned on a garment mold with the adhesive side facing outwardly, i.e., away from the mold. It is to be noted that positioning the textile on the garment mold prior to applying the adhesive to the textile is within the scope of the invention. Alternatively, the adhesive may be positioned on a side of a conformable ePTFE tape and the tape positioned during the molding step such that the adhesive faces the textile on the garment mold.

The adhesive may be applied discontinuously or continuously, provided that breathability through the resulting laminate is maintained. For example, an adhesive may be applied in the form of discontinuous attachments, such as by discrete dots or in a grid pattern, or in the form of an adhesive web to adhere the layers of the laminate together. Alternatively, a breathable adhesive may be applied in a continuous manner to form a layer of adhesive to adhere the layers of the laminate together. The adhesive may be a layer of a thermally activating adhesive where activation of the adhesive can be affected by a heating device. Selection of suitable adhesive may vary depending on the materials and molding conditions.

The textile used to form the garments may be any textile that is air permeable and breathable and that has at least some elastic properties. Elastic, as used herein, is meant to denote that the material has stretch characteristics and can be tensioned; and, upon the release of tension, the material returns to its approximate original dimensions. When forming a garment which is relatively close-fitting to the body, a textile may be selected having a high elasticity, or an elasticity of at least about 50%, at least about 75%, or at least about 100% or greater. The term "highly elastic" as used herein is meant to describe materials that have stretch characteristics and can be tensioned at least about 50% (or greater); and, upon the release of tension, the material returns to its approximate original dimensions.

The textile may be comprised of materials such as, but not limited, to cotton, rayon, nylon, polyester, silk, lycra, spandex, elastane, and blends thereof. The weight of the material forming the textile is not particularly limited except as required by the application. In some embodiments, the textile may impart sufficient abrasion resistance to the laminate to provide adequate protection for the wearer of the garment.

In embodiments where one or more textile is incorporated in the garment and where size of the resulting garment permits, after the adhesive is applied to either the textile or to the conformable ePTFE tape, or both, the ePTFE tape is stretched over the garment form. In alternative embodiments, the garment mold may be attached to a rotatable arm and the mold is rotated to move through the conformable ePTFE tape, which stretches the conformable ePTFE over the mold and into a seamless, conformed ePTFE membrane having the general shape of the mold. The adhesive may be a continuous breathable adhesive or a discontinuous adhesive. The ePTFE tape may be held in a fixed orientation relative to the mold prior to moving the mold through the conformable ePTFE tape. In addition, the conformable ePTFE tape may be pre-heated prior to conforming over the garment mold Alternatively, the conformable ePTFE membrane may be manually stretched over the garment mold. At this stage in the process, the garment mold contains thereon the textile, adhesive 40, and the seamless, conformed ePTFE membrane (i.e., a 2-layer article).

An abrasion resistant coating may be applied to the ePTFE membrane to protect the seamless, conformed ePTFE membrane from wear and/or damage. In a 2-layer article, an abrasion resistant coating may be applied to the ePTFE membrane. In use, the 2-layer article may be positioned such that the coating faces away from the wearer or it may be positioned such that the coating faces the wearer of the garment. An abrasion resistant coating may also or alternatively be applied to the surface of the textile. It is to be appreciated that other coatings (e.g., colorants, oleophobic coatings, etc.) may be applied in addition to, or in place of, the abrasion resistant coating. The coating(s) may be applied to all or part of the surface(s) of the ePTFE membrane or to all or part of the surface(s) of the textile.

In forming a three-layer laminate, a second adhesive may be applied to a second textile and the second textile/adhesive composite is stretched over the garment mold with the adhesive positioned on the exposed surface of the ePTFE membrane. Thus, the garment mold has thereon the first textile, the first adhesive, a seamless, conformed ePTFE membrane, the second adhesive, and the second textile (i.e., a 3-layer article). It is to be understood that the first and second textile layers and adhesive layers 60 may be the same or different from one another. Additionally, it is to be appreciated that laminates may contain any number of layers as long as the laminate meets the properties described herein. Coatings may also be similarly applied as describe above.

The temperature in the conforming step is ultimately dependent upon the adhesive(s) utilized, and should not be so high as to degrade and/or render useless any portion of the garment described herein. Additionally, the conforming step adheres the textile layer(s) to the ePTFE membrane, and in certain embodiments pressure and/or vacuum may be utilized. The heating may occur in a conventional oven, an air circulating oven, via the garment mold itself, or the like.

FIGS. 1-9 illustrate various garments that comprise a conformable ePTFE membrane or conformable film material. Each of these garments have a three dimensional configuration. Referring to FIG. 1, there is shown a schematic illustration depicting a three dimensional seamless glove 100 according to at least one embodiment of the present invention. In one embodiment, glove 100 may comprise an inner layer of seamless conformable ePTFE membrane 102 that is adhered to an outer textile layer 104. Glove 100 may have an opening 106 so that the glove may be worn by a user. Depending on how the textile 104 is assembled, textile layer may comprise seams to join multiple pieces of textiles together in the arrangement of the glove 100. For purposes of the present invention, seamless refers to the characteristics of the conformable ePTFE membrane 102 that does not contain a seam. As shown in FIG. 1, to be seamless the ePTFE membrane continuously surrounds or encircles the glove in at least one plane without a seam. Advantageously this reduces the need for using seam tape and may improve the waterproof characteristics. In addition, this may reduce manufacturing time by eliminate the need to apply the seam tape. In contrast, a sheet of ePTFE membrane that is wrapped around a three dimensional mold would have a seam for joining opposing ends of the sheet and this would require seam tape and likewise two ePTFE membranes that are wrapped around a three-dimensional mold would require seam tape along two different seams.

Although the conformable ePTFE membrane 102 is shown as an interior layer, it should be understood that in other embodiments, conformable ePTFE membrane 102 may be an outer layer. In an another embodiment, glove 100 may be constructed from a three-layer composite that further comprises a second textile layer on the inside surface of the conformable ePTFE membrane 102.

Figure 2:
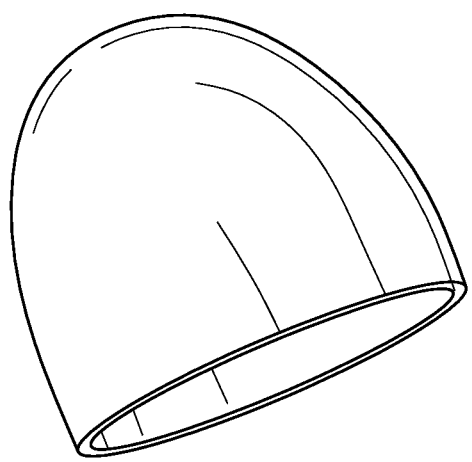
FIG. 2 is a schematic illustration depicting a three dimensional seamless hat according to at least one embodiment of the present invention.
Figure 3:
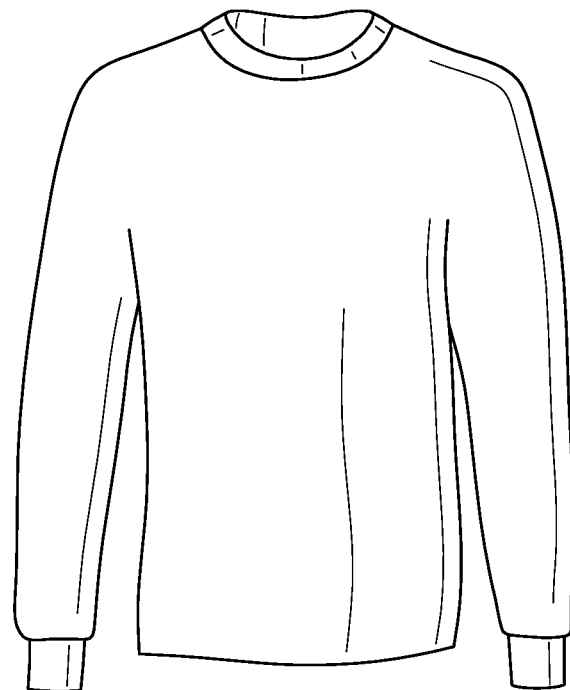
FIG. 3 is a schematic illustration depicting a three dimensional seamless shirt according to at least one embodiment of the present invention.
Figure 4:
FIG. 4 is a schematic illustration depicting a three dimensional seamless jacket according to at least one embodiment of the present invention.
Figure 5:
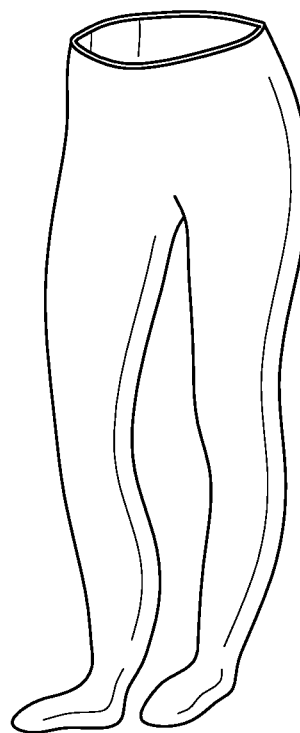
FIG. 5 is a schematic illustration depicting three dimensional seamless leggings according to at least one embodiment of the present invention.
Figure 6:
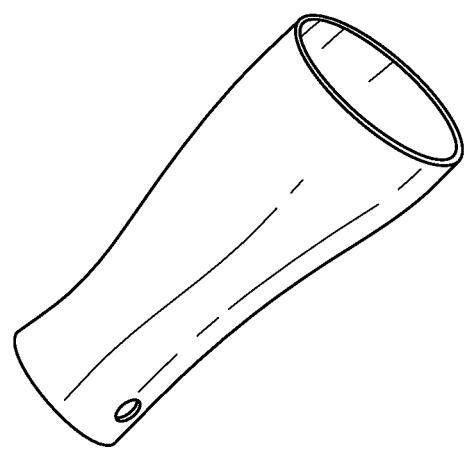
FIG. 6 is a schematic illustration depicting a three dimensional seamless arm covering comprising an oven sleeve according to at least one embodiment of the present invention.
Figure 7:
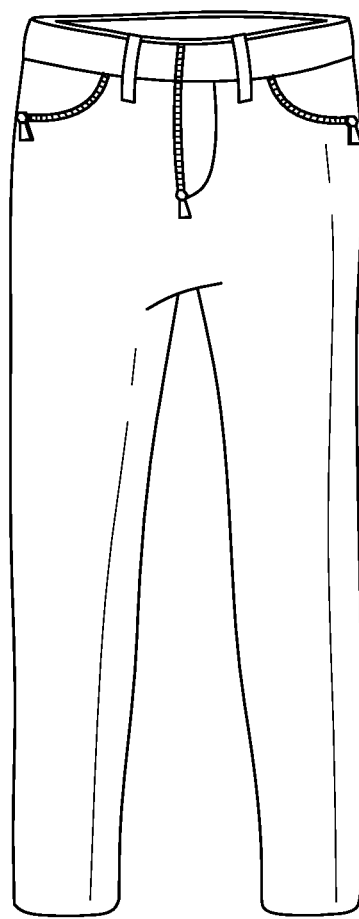
FIG. 7 is a schematic illustration depicting three dimensional seamless pants according to at least one embodiment of the present invention.
Figure 8:
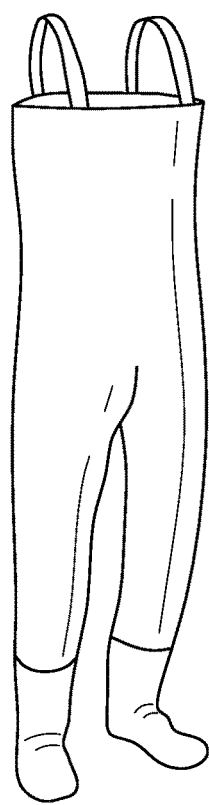
FIG. 8 is a schematic illustration depicting a three dimensional seamless leg covering comprising a wader according to at least one embodiment of the present invention.
Figure 9:
FIG. 9 is a schematic illustration depicting a three dimensional seamless leg covering comprising a stirrup according to at least one embodiment of the present invention.

Other garments that may be formed on different three-dimensional molds are also shown in the other figures that may be constructed from two-layer composites or three-layer composites. Referring to FIG. 2, there is shown a schematic illustration depicting a three dimensional seamless hat according to at least one embodiment of the present invention. FIG. 3 is a schematic illustration depicting a three dimensional seamless shirt according to at least one embodiment of the present invention. FIG. 4 is a schematic illustration depicting a three dimensional seamless jacket according to at least one embodiment of the present invention. FIG. 5 is a schematic illustration depicting three dimensional seamless leggings according to at least one embodiment of the present invention. FIG. 6 is a schematic illustration depicting a three dimensional seamless arm covering comprising an oven sleeve according to at least one embodiment of the present invention. FIG. 7 is a schematic illustration depicting three dimensional seamless pants according to at least one embodiment of the present invention. FIG. 8 is a schematic illustration depicting a three dimensional seamless leg covering comprising a wader according to at least one embodiment of the present invention. FIG. 9 is a schematic illustration depicting a three dimensional seamless leg covering comprising a stirrup according to at least one embodiment of the present invention.

In certain embodiments, the garment may entirely comprise a seamless conformable ePTFE membrane or film material. In other embodiments, the garment may comprise a portion of the seamless conformable ePTFE membrane or film membrane and a second component. A second component may be attached in certain embodiments to the seamless, waterproof, breathable garment. The second component may provide a different function or feature and/or it may be formed of a different material from the garment. The additional component may be, for instance, a textile, a laminate (e.g., a laminate including a polymer membrane), a textile laminate, a polymer membrane, or a second conformed or shaped polyurethane film different from the first conformed or shaped ePTFE membrane (e.g., having a characteristic or property different from the first conformed or shaped ePTFE membrane) in garment. The selection of the second component is not particularly limited, and may be chosen depending on the desired quality or property. It is to be appreciated that the second component(s) may be used, for example, to tailor the garment to achieve desired properties and/or a desired appearance. The second component may be attached to the garment by any conventional joining or attaching method. In one exemplary application, the garment may be jacket comprising arm portions made of a second component and a torso region comprising a seamless conformable ePTFE membrane. The garment may be referred to as a hybrid garment due to the use of two different materials.

EXAMPLES

It should be understood that although certain methods and equipment are described below, any method or equipment determined suitable by one of ordinary skill in the art may be alternatively utilized.

Example 1

Mold Construction

A hand mold for forming gloves of the invention was constructed from aluminum plate and copper tubing, with fingertips simulated using ball and socket joints taken from Flexbar Universal Holder model 18206-18308 (Flexbar Machine Corporation, 250 Gibbs Road, Islandia, N.Y. 11749). The palm and wrist of the hand mold was shaped from a single piece of 19 mm (¾") thick aluminum plate. Holes were drilled for the 4 fingers. Fingers were made from lengths of 16 mm (⅝") diameter copper pipe that were inserted into the holes and tipped with Flexbar joints. All 4 fingers were extended straight and pointed vertically. An approximately 6 mm (¼") gap was left between each finger to ensure access during the fabrication of the gloves. The thumb assembly was shaped from a 25 mm (1") thick aluminum plate, 16 mm (⅝") diameter copper pipe and tipped with a Flexbar joint. The thumb assembly was attached to the palm of the mold so the thumb appeared flexed, and rotated so the thumb was pointed straight and vertical, parallel to the index finger, leaving a 9 mm (⅜") gap between the palm and the thumb. A steel rod was fixed to the base of the wrist so that the hand mold could be inserted into a base and rotated to facilitate forming the membrane over the mold. Attaching the hand mold to a base improved general handling, and facilitated placing the mold in an oven. The overall dimensions of the hand mold, not counting the base, was approximately 300 mm high by 85 mm wide by 45 mm deep For the purposes of replication, many different variants of the above fixture can be used, including but not limited to plaster casts of the hand. Care should be taken to leave sufficient gaps in the joints between the fingers. Also, while it is possible to have fixtures with undercuts, it is best if undercuts are minimized to facilitate tape contact and a uniform heat transfer during heat treatment.

Glove Formation

A fine powder of PTFE polymer (Daiken Industries, Ltd., Orangeburg, N.Y.) was blended with Isopar® K (Exxon Mobil Corp., Fairfax, Va.) in the proportion of 0.196 g/g of fine powder. The lubricated powder was compressed in a cylinder to form a pellet and placed into an oven set at 70° C. for approximately 12 hours. Compressed and heated pellets were ram extruded to produce tapes approximately 15.2 cm wide by 0.73 mm thick. Three separate rolls of tape were produced and layered together between compression rolls to a thickness of 0.76 cm. The tape was then transversely stretched to 56 cm (i.e., at a ratio of 3.7:1), restrained, and then dried in an oven set at 270° C. The dry tape was longitudinally expanded between banks of rolls over a heated plate set to a temperature of 340° C. The speed ratio between the second bank of rolls and the first bank of rolls, and hence the expansion ratio, was 8:1.

To form a glove from the ePTFE tape, an approximately 1.5 m long piece of ePTFE tape was cut from the roll. Leaving about 150 mm (6") free at the wrist and starting with the pinky, the tape was threaded along the fingers of the mold, contacting each finger from tip to base. The centerline of the tape lay on each fingertip and base. After threading over each finger and in order to help keep the tape in place during setup, the tape was gently pulled down about 12 mm (½") on each fingertip and at each base. Once reaching the thumb, the tape was redirected so that the centerline of passed over the joint and tip of the thumb, and also held in place by pulling downward on the tape, stretching it slightly over the thumb tip. After threading between each finger and the thumb, the tape was stretched at each finger and joint, starting with the middle finger. The edges of the tape were grasped along both sides and pulled down along the front and back of the hand simultaneously. The tape edges were pulled down approximately 25 to 50 mm (1-2 inches) at each finger and gap before proceeding to the next finger. The tape at each finger and joint was stretched sequentially, with the cycle repeated until the edges of the tape reached the wrist. Once the tape had been pulled to the wrist, the excess material was gathered around the wrist and tucked under the bottom of the mold.

To prevent the tape from pulling back during heating, lengths of steel or copper wire were wrapped from the base of each finger to the base of the wrist. If no powder was sprinkled, dusted or flocked onto the glove, pipe tape or other similar material may also be used, including any material that will melt, so long as the reinforcement helps to hold the PTFE in place during heat treatment. The reinforcing wire was tied around the base, gathering the excess PTFE material at the same time.

Amorphous Locking

An oven was heated to 370 C. After the glove insert was prepared on the hand mold (see above), the mold and prototype was placed in the oven at 370 C. After 10 min, the samples were removed from the oven and cooled to room temperature. The glove was removed from the mold by untying the wire, grasping the material at the wrist and pulling towards the fingertips, inverting the prototype.

Example 2

An FEP dusted glove insert was made. In this case, the oven was heated to 380 C. A glove insert was prepared on the hand mold as described in Example 1, and the mold and glove were placed in the oven at 380 C. After preheating for approximately 5 minutes, the glove and mold was removed from the oven. Next, the exterior of the glove was dusted with NC1500 FEP and placed back in the oven for 2 minutes at 380 C. The fixture was then removed from the oven and cooled to room temperature. The glove was removed from the mold by untying the wire, grasping the ePTFE membrane at the wrist and pulling towards the fingertips, inverting the glove insert. Once removed, the glove insert could then be re-inverted.

Example 3

Three THV dusted gloves were made as described herein. In each case, the oven was preheated to the temperatures specified as listed below.

Three glove inserts were prepared on the hand mold as described in Example 1, and the mold was placed in the oven. After the preheat time, if used, specified below, the sample was removed from the oven and dusted with THV 221 AZ and placed back in the oven to melt the THV. Samples were either removed and then cooled to room temperature, or alternately dusted with THV for a second time and placed back in the oven, repeated as specified below. After final removal and cooling, the glove was removed from the mold by untying any anchor wires, grabbing the material at the wrist and pulling towards the fingertips, inverting the glove.

THV Treatment of Samples 3A-C:

Sample 3A: No preheat, dusted with THV 221AZ, placed in oven at 220 C 5 min. Dusted a second time with THV, and oven dwell 220 C for 5 min. Dusted a third time with THV, and oven dwell 220 C for 5 min.

Sample 3B: No preheat, dust with THV 221AZ, placed in oven at 230 C for 5 min. Removed from oven, dusted fingertips with THV, replaced in oven at 240 C for 5 min. Removed from oven and dusted palm and back with THV, replaced in oven 240 C for 5 min.

Sample 3C: Preheated mold with glove in oven at 370 C for 7 min. Turned oven down to 260 C and removed mold from oven. Dusted w/THV221AZ and replaced in oven at 260 C for 5 min.

Example 4

An adult lower body male mannequin form was purchased online. The mannequin form included the waist, legs, feet and toes. The mannequin leg form was approximately 1.1 m tall, 0.35 m wide and 0.25 m deep.

The form was set on a swivel table so that the legs pointed vertically. An approximately 5 m length (6 inches wide) of PTFE material described in Example 1 was cut and prepared by drawing a grid of ½" squares along the length and width of the material, coincident with the centerline of the length. The grid helped place and orient the material, as well as provided a perspective of the distortion of the material. The midpoint of the material was found and held at the center point (crotch) of the mannequin, with the material draped over both legs and the tape centerline coincident with the coronal plane of the mannequin. With this orientation the free ends of the tape extended approximately 12" past the lateral portion of the waist on either side of the mannequin form. After threading the tape over the legs, both sides of the material were pulled over the foot by grabbing both edges and gently pulling straight down toward the waist about 2 inches. This way the material stayed in place while other sections were being pulled. This process was repeated with the other foot and the crotch.

Once the material was fixed in place the tape was stretched by pulling the edges of the tape toward the waist. This was done by grasping both sides of the tape, or alternately by placing one hand on the mannequin foot and pulling one edge of the tape. Only 2 to 4 inches was pulled at a time in any one place so as not to over stretch the material. When necessary a hair dryer was used to apply mild heat to soften the PTFE. It was also possible to utilize extra material by first pulling a tape edge laterally or distally (towards the kneecap) and then pulling downward toward the waist. This process was repeated as needed over the perimeter of the tape, until the all the edges of the tape had been pulled to the waist.

Once the material had reached the waist, the edges were tucked underneath the rim of the mannequin to help hold the shape.

Example 5

An adult male mannequin torso with rotating arms was purchased online. The mannequin form included the torso from the neck at the base of the skull to the waist, as well as arms to the wrists. Overall dimensions of the mannequin torso were 0.6 m high by 0.5 m w by 0.35 m deep with arms at sides, increasing to 1 m tall with the arms extended vertically.

The form was set on a swivel table so that the torso was upright, with the arms of the mannequin rotated into the vertical position. A length of ePTFE tape as described in Example 1 approximately 3 m long by 6 inches wide was cut and draped over the mannequin such that the centerline of the tape lay in the coronal plane of the mannequin, with the midpoint of the tape at the intersection of the sagittal and coronal planes, or centered at the top of the neck.

To help hold the tape in place, the tape edges were grabbed near the center point and pulled down approximately 2 inches, stretching the tape over the top of the neck to the base of the throat on the front and the C7 vertebrae on the back. Once the tape was threaded up the length of the arm, a similar technique was used at each wrist, stretching that portion of the tape downward so that portion of tape stayed fixed at the wrist.

After the material was fixed in place, the edges of the tape were stretched towards the waist. Starting with the arms, sections of material were pulled downward by grabbing both sides of the tape, or alternately by placing one hand on the mannequin wrist, and pulling one edge of the tape. Only 2 to 4 inches of tape was pulled at a time in any one place so as not to over stretch the material. While stretching, a hair dryer was used to apply heat to soften the PTFE and facilitate distortion. Particularly for the arms, extra material was recruited by pulling tape edges towards the elbow, and then pulling downward toward the waist. This procedure was repeated as needed over the perimeter of the tape, until the edges of the tape reached the waist.

Once the PTFE has been stretched to the waist of the mannequin, the edges of the tape were tucked underneath the rim of the mannequin to help hold the shape. After fixing the tape in place, pieces of a heat activated flexible double stick reinforced adhesive (soft bond) were attached to the neck, waist, shoulder, wrist and forearm areas of the stretched PTFE. The outer backer was left on the tape while the turtleneck was prepared.

A turtleneck pullover shirt (Puritan brand, cotton polyester size medium) was purchased from Walmart. The turtleneck was turned inside out and slid over the mannequin. Once the turtleneck was in position, the backer was removed from the pieces of double sided adhesive tape. The PTFE and turtleneck shirt were then bonded together at the adhesion points using a clothes iron to activate the double sided adhesive. After trimming the PTFE at the neck, wrists and waist, the turtleneck shirt assembly was removed from the mannequin and inverted, leaving the stretched PTFE on the outside.

What is claimed is:

1. A garment comprising:
a seamless conformed polytetrafluoroethylene (ePTFE) membrane having a first side and a second side and having a three dimensional configuration of the garment or a portion thereof.

2. The garment of claim 1, further comprising a first textile joined to the first side of the conformed ePTFE membrane, and wherein the seamless conformed ePTFE membrane and the textile form a laminate.

3. The garment of claim 2, wherein a second textile is joined to the conformed ePTFE membrane on the second side opposing the first textile, and wherein the seamless conformed ePTFE membrane, the first textile, and the second textile form a laminate.

4. The garment according to claim 3, wherein at least one of the first textile and the second textile has at least some elastic properties.

5. The garment according to claim 3, wherein the first textile and the second textile are selected from the group consisting of a knitted textile and a woven textile.

6. The garment according to claim 3, wherein the first textile forms an interior portion of the garment, and the second textile forms an exterior portion of the garment.

7. The garment according to claim 6, wherein at least one of the first textile and the second textile has at least one additional layer thereon.

8. The garment according to claim 7, wherein the at least one additional layer is selected from the group consisting of an abrasion resistant coating and an oleophobic coating.

9. The garment according to claim 1, wherein the conformed ePTFE membrane, has at least one additional layer thereon.

10. The garment according to claim 1, wherein the conformed ePTFE membrane has a thickness variation from a first location in the garment to a second location in the garment.

11. The garment according to claim 1, wherein the garment is waterproof.

12. The garment according to claim 1, wherein the garment is waterproof and breathable.

13. The garment according to claim 1, further comprising at least one second component joined to the conformed ePTFE membrane which creates at least one region in the garment, the at least one region possessing a function or feature different from the conformed ePTFE membrane.

14. The garment according to claim 13, wherein the at least one second component is selected from the group consisting of a textile, a second component laminate, a textile laminate, a polymer membrane, or a second ePTFE membrane different from the conformed ePTFE membrane.

15. The garment according to claim 1, further comprising an adhesive selected from a discontinuous adhesive and a continuous breathable adhesive positioned on at least one of the ePTFE membrane, the first textile, and the second textile.

16. The garment according to claim 1, wherein the garment is in the form of a glove.

17. The garment according to claim 1, wherein the garment is in the form of a hat.

18. The garment according to claim 1, wherein the garment is in the form of a shirt.

19. The garment according to claim 1, wherein the garment is in the form of an upper torso covering.

20. The garment according to claim 1, wherein the garment is in the form of a lower torso covering.

21. The garment according to claim 1, wherein the garment is in the form of a jacket.

22. The garment according to claim 1, wherein the garment is in the form of leggings.

23. The garment according to claim 1, wherein the garment is in the form of pants.

24. The garment according to claim 1, wherein the garment is in the form of a leg covering.

25. The garment according to claim 1, wherein the garment is in the form of an arm covering.

26. A garment comprising:
a seamless conformed film having a first side and a second side and having a three dimensional configuration of the garment or a portion thereof, wherein the film is selected from the group consisting of polyurethane (PU), polyethylene (PE), polyester (PES), polypropylene (PP), polyether (PE), polyacrylonitrile (PAN), polystyrene, polyamide, polybenzimidazole (PBI), polycarbonate, polyethylene-co-vinyl acetate (PEVA), polyvinylchloride (PVC), cellulose acetate, polyimide, and block and random copolymers thereof.

* * * * *